(12) United States Patent
Brown

(10) Patent No.: US 10,017,120 B1
(45) Date of Patent: Jul. 10, 2018

(54) SIDE-VIEW VEHICLE MIRROR

(71) Applicant: Moses Brown, Bronx, NY (US)

(72) Inventor: Moses Brown, Bronx, NY (US)

(*) Notice: Subject to any disclaimer, the term of this patent is extended or adjusted under 35 U.S.C. 154(b) by 0 days.

(21) Appl. No.: 15/584,139

(22) Filed: May 2, 2017

(51) Int. Cl.
*B60R 1/074* (2006.01)
*B60R 1/072* (2006.01)
*B60R 1/00* (2006.01)
*B60R 1/07* (2006.01)

(52) U.S. Cl.
CPC ............. *B60R 1/074* (2013.01); *B60R 1/006* (2013.01); *B60R 1/072* (2013.01); *B60R 1/07* (2013.01)

(58) Field of Classification Search
CPC .......... B60R 1/006; B60R 1/072; B60R 1/074
USPC .................... 359/607, 840, 841, 843, 877
See application file for complete search history.

(56) References Cited

U.S. PATENT DOCUMENTS

| | | | | |
|---|---|---|---|---|
| 3,132,201 A * | 5/1964 | Bertell | ............. | B60R 1/0612 |
| | | | | 359/511 |
| 3,377,880 A * | 4/1968 | Carter, Jr. | ............. | B60R 1/0617 |
| | | | | 359/841 |
| 3,666,354 A * | 5/1972 | Russell | ............. | B60R 1/087 |
| | | | | 359/604 |
| 3,741,633 A * | 6/1973 | Haley | ............. | B60R 1/025 |
| | | | | 359/862 |
| 4,136,925 A * | 1/1979 | Menzies | ............. | B60R 1/0602 |
| | | | | 359/508 |
| 4,158,483 A * | 6/1979 | Fisher | ............. | B60R 1/072 |
| | | | | 359/876 |
| D279,666 S | 7/1985 | Tanaka | | |
| 4,770,522 A * | 9/1988 | Alten | ............. | B60R 1/072 |
| | | | | 248/485 |
| 4,957,359 A * | 9/1990 | Kruse | ............. | B60R 1/06 |
| | | | | 248/481 |
| 5,210,651 A | 5/1993 | Shilbuya | | |
| 5,521,744 A * | 5/1996 | Mazurek | ............. | B60R 1/085 |
| | | | | 359/267 |
| 5,640,281 A | 6/1997 | Cho | | |
| 5,886,838 A * | 3/1999 | Kuramoto | ............. | B60R 1/07 |
| | | | | 248/480 |
| 5,917,666 A * | 6/1999 | Kimble | ............. | B60R 1/02 |
| | | | | 359/838 |
| 5,940,230 A | 8/1999 | Crandall | | |
| 6,808,274 B2 | 10/2004 | Raines | | |
| 7,427,141 B2 * | 9/2008 | Kim | ............. | B60R 1/085 |
| | | | | 359/605 |
| 2002/0008923 A1 * | 1/2002 | Swindon | ............. | B60R 1/072 |
| | | | | 359/879 |

(Continued)

FOREIGN PATENT DOCUMENTS

CN        201136464 Y     10/2008
JP         58-16938    *  1/1983

*Primary Examiner* — Ricky D Shafer

(57) ABSTRACT

The side-view vehicle mirror is an exterior mirror for use on a vehicle. The mirror can be rotated 180° when the vehicle is parked so that the glass surface of the mirror is moved to a protected position within the mirror housing and a more durable back cover for the mirror is presented externally to the vehicle. The mirror can be made to rotate from controls located within the passenger cabin. In some embodiments, the hidden exterior vehicle mirror rotates into the protected position by itself whenever the vehicle engine is turned off and automatically rotates into the usable mirror position when the vehicle is restarted.

9 Claims, 5 Drawing Sheets

(56) References Cited

U.S. PATENT DOCUMENTS

2004/0240023 A1 12/2004 Luna
2015/0098144 A1 4/2015 Kim

* cited by examiner

SIDE-VIEW VEHICLE MIRROR

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of vehicular accessories, more specifically, an exterior vehicular mirror that can be rotated into a position that protects the glass mirror when the vehicle is not in use.

An exterior vehicular mirror is a reflective surface such silvered or aluminized glass mounted outside of a vehicle and positioned to allow the vehicle operator to see what is behind the vehicle. On passenger vehicles and small trucks it is common to provide a housing around an exterior vehicular mirror in order to make the exterior vehicular mirror more streamlined, to provide some level of protection for the mirror, and to improve the vehicle's appearance.

When a vehicle is parked, especially when parked along a busy street, the mirror may still be susceptible to damage. The damage may be intentional, as in the case of pranksters throwing rocks or other objects at the mirror, or the damage may be accidental, as in the case of flying debris kicked up from nearly traffic or lawnmowers.

SUMMARY OF INVENTION

The side-view vehicle mirror is an exterior mirror for use on a vehicle. The mirror can be rotated 180° when the vehicle is parked so that the glass surface of the mirror is moved to a protected position within the mirror housing and a more durable back cover for the mirror is presented externally to the vehicle. The mirror can be made to rotate from controls located within the passenger cabin. In some embodiments, the hidden exterior vehicle mirror rotates into the protected position by itself whenever the vehicle engine is turned off and automatically rotates into the usable mirror position when the vehicle is restarted.

An object of the invention is to protect a vehicle exterior mirror when the vehicle is not in use.

A further object of the invention is to allow control of the exterior mirror protection feature from within the passenger cabin of the vehicle.

Yet another object of the invention is to allow the mirror protection feature to automatically protect the exterior mirror when the vehicle's engine is turned off or key is withdraw from the ignition switch and to automatically return the exterior mirror to a usable position when the vehicle's engine is started or a key is inserted into the ignition switch.

These together with additional objects, features and advantages of the side-view vehicle mirror will be readily apparent to those of ordinary skill in the art upon reading the following detailed description of the presently preferred, but nonetheless illustrative, embodiments when taken in conjunction with the accompanying drawings.

In this respect, before explaining the current embodiments of the side-view vehicle mirror in detail, it is to be understood that the side-view vehicle mirror is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the side-view vehicle mirror.

It is therefore important that the claims be regarded as including such equivalent construction insofar as they do not depart from the spirit and scope of the side-view vehicle mirror. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "control" is intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw.

As used herein the term "mirror position" is intended to mean a position of the exterior mirror where the reflective glass side is properly positioned for use by the vehicle operator as a means of seeing behind the vehicle. As used herein, the term "protected position" is intended to mean a position of the exterior mirror where the mirror is rotated 180° from the mirror position and therefore the protected back surface of the mirror is exposed to the outside while the reflective glass side of the mirror is safely inside the side-view vehicle mirror. As used herein, the word "or" is intended to be inclusive.

Figure 1:
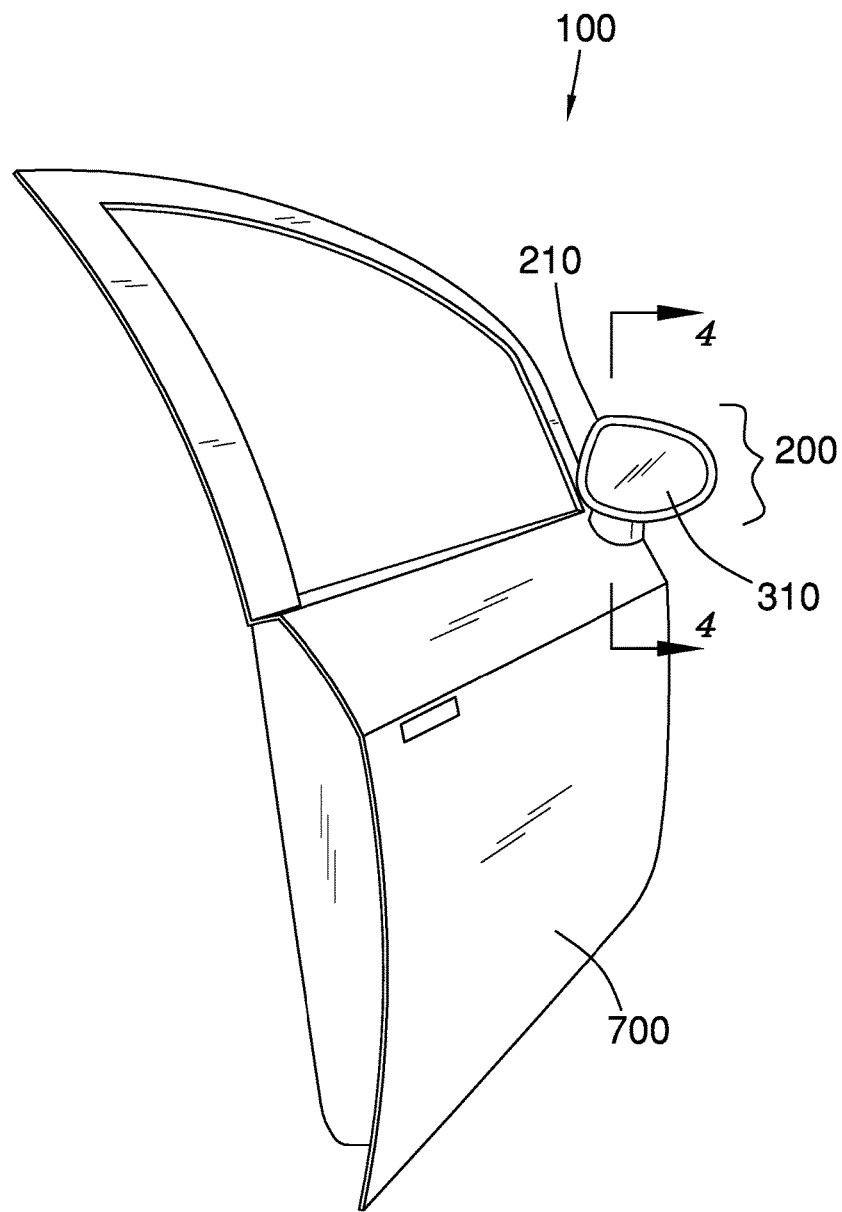
FIG. 1 is a perspective view of an embodiment of the disclosure with the glass side of the mirror exposed.
Figure 2:
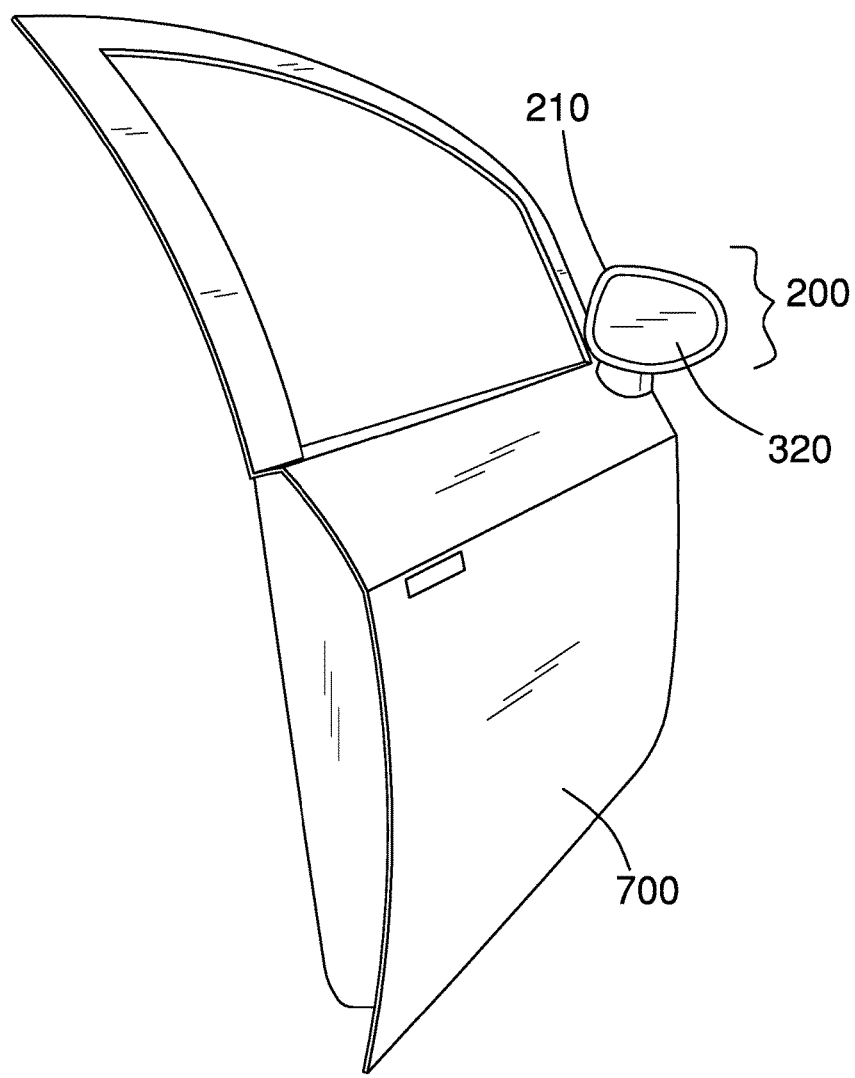
FIG. 2 is a perspective view of an embodiment of the disclosure with the protected back side of the mirror exposed.
Figure 3:
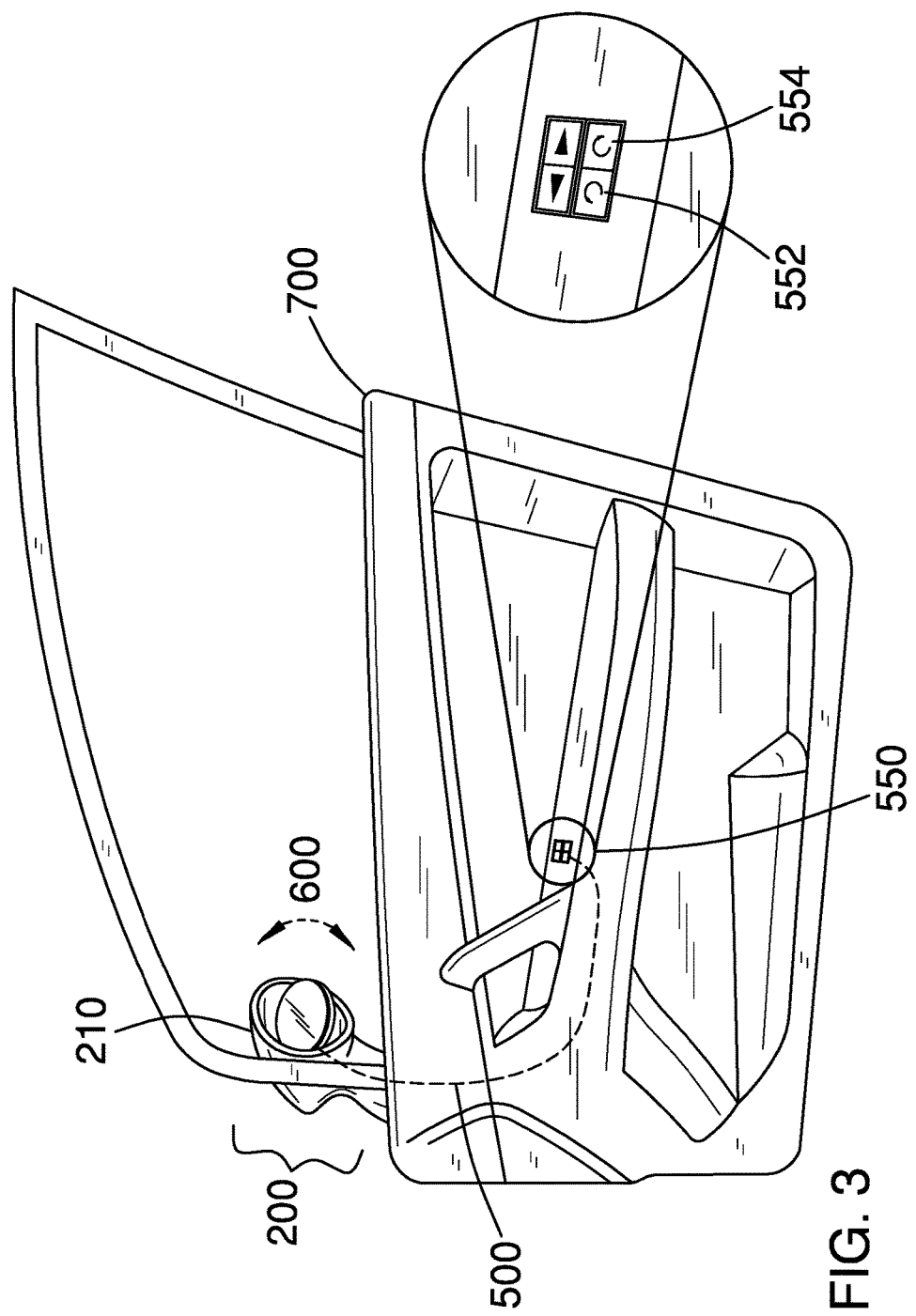
FIG. 3 is a view of an embodiment of the disclosure from a vantage point inside of the vehicle.
Figure 4:
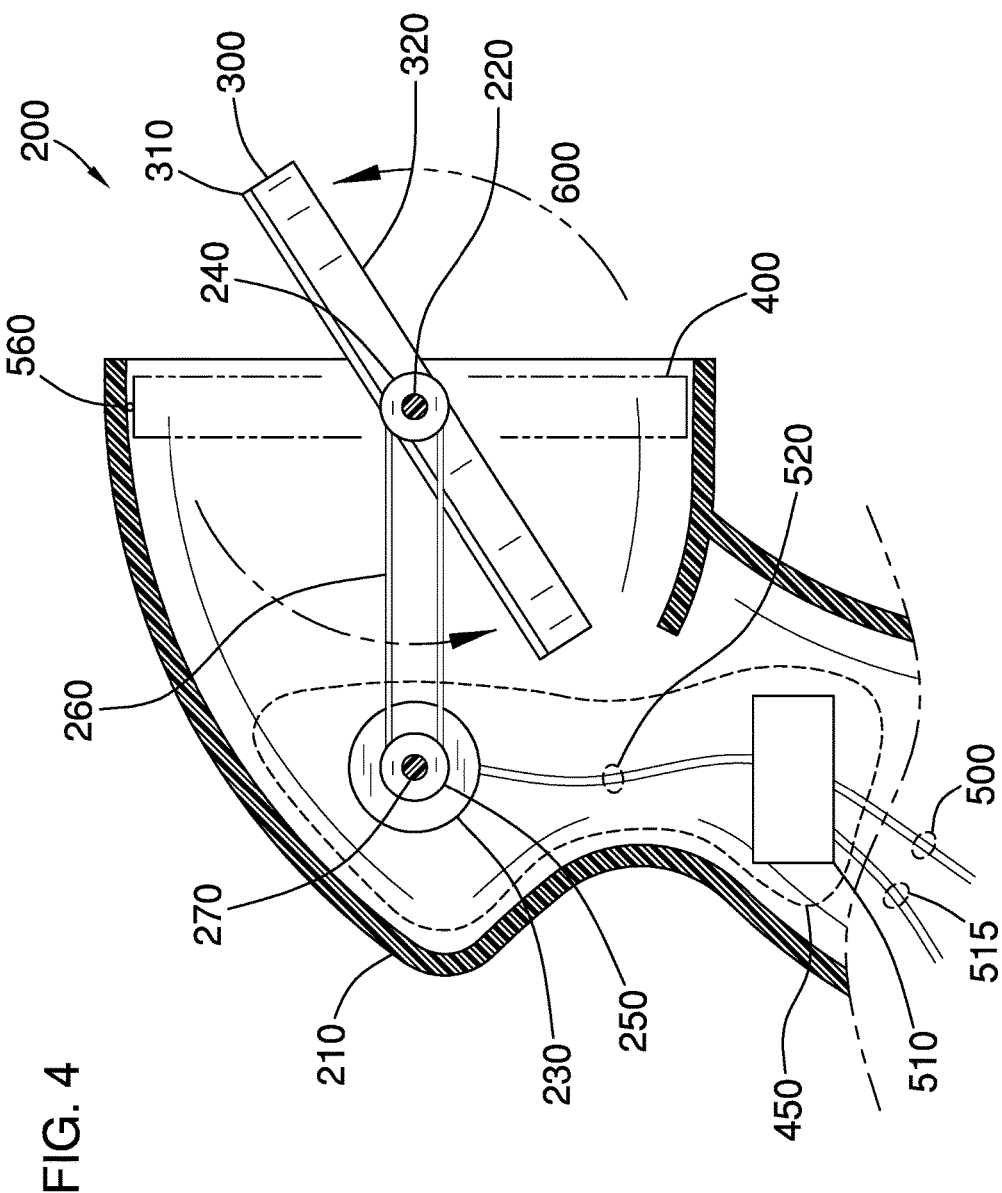
FIG. 4 is a cross-sectional view of an embodiment of the disclosure across 4-4 as shown in FIG. 1.
Figure 5:
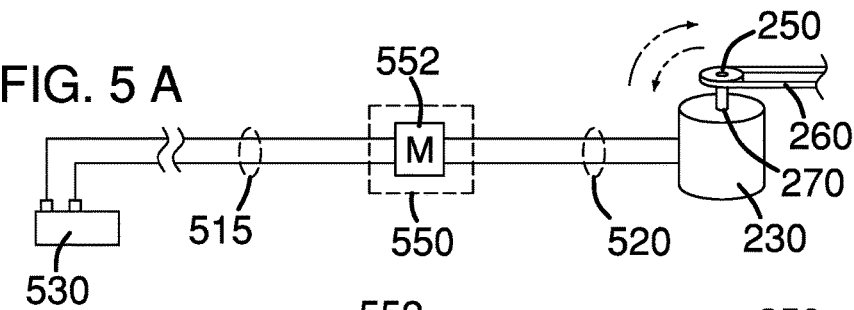
FIG. 5A is a schematic diagram of electrical connections to an embodiment of the disclosure utilizing a single operator control and no control circuit board.
FIG. 5B is a schematic diagram of electrical connections to an embodiment of the disclosure utilizing two operator controls and no control circuit board.
FIG. 5C is a schematic diagram of electrical connections to an embodiment of the disclosure utilizing a single operator control and a control circuit board.
FIG. 5D is a schematic diagram of electrical connections to an embodiment of the disclosure utilizing two operator controls and a control circuit board.
Figure 5:
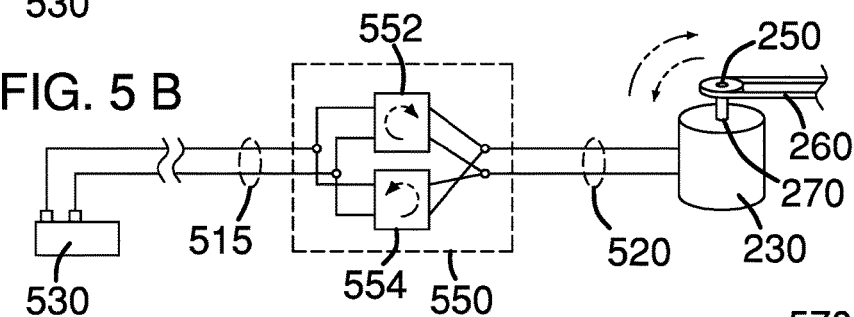
Figure 5:
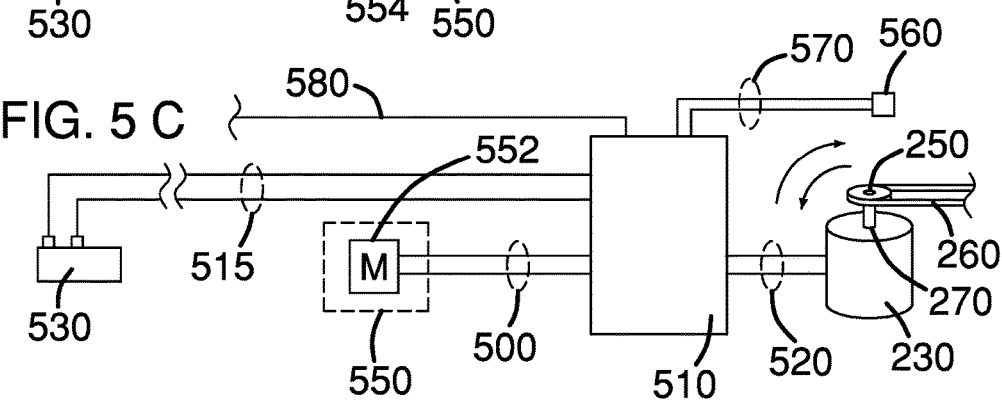
Figure 5:
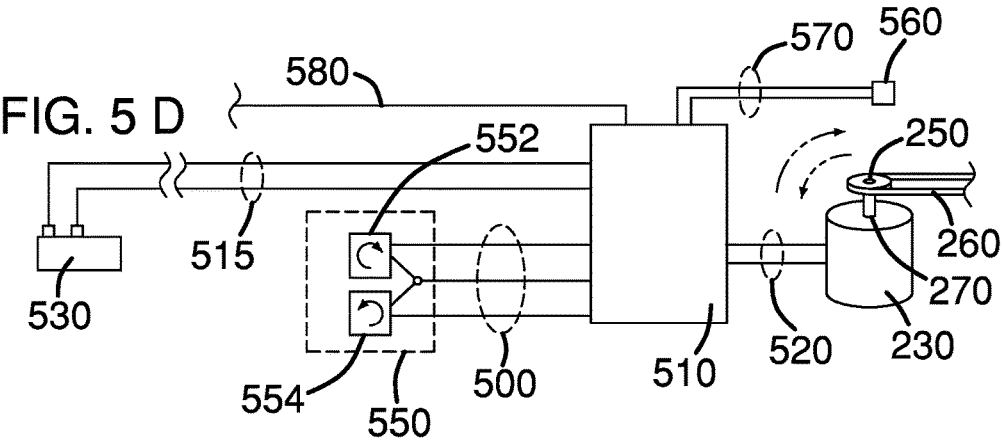

Detailed reference will now be made to a first potential embodiment of the disclosure, which is illustrated in FIGS. 1 through 5.

The side-view vehicle mirror 100 (hereinafter invention) comprises an exterior mirror assembly 200, operator controls 550, control wiring 500, and power wiring 515. The exterior mirror assembly 200 is mounted outside of a vehicle 777. As a non-limiting example, the exterior mirror assembly 200 may be mounted on a door panel 700 of the vehicle. The exterior mirror assembly 200 may be mounted on the left side of the vehicle 777, on the right side of the vehicle 777, or on both sides of the vehicle 777. The operator controls 550 located within the passenger cabin of the vehicle 777 receive electricity from a vehicle battery 530 via the power wiring 515 and may cause a mirror 300 mounted within the exterior mirror assembly 200 to rotate 600 by 180° thus moving a glass side of the mirror 310 to a position within the exterior mirror assembly 200 and presenting a protected back side of the mirror 320 outside of the vehicle 777.

The exterior mirror assembly 200 comprises a mirror housing 210, a pivot axis 220, a servo motor 230, a first pulley 240, a second pulley 250, a drive belt 260, and the mirror 300. The mirror housing 210 supports and protects the other components of the exterior mirror assembly 200.

The mirror housing 210 mounts onto the door panel 700 or other exterior surface of the vehicle 777. It may improve the vehicle 777 appearance and aerodynamics when compared to a mirror mounted outside of the vehicle 777 with no housing around it. The pivot axis 220 is a rod connected to the inside of the mirror housing 210 at two opposing inside walls of the mirror housing 210. The pivot axis 220 passes through the mirror 300, which is pivotally mounted on the pivot axis 220. The first pulley 240 is mounted to the top of the mirror 300. The pivot axis 220 also passes through the first pulley 240 and the first pulley pivots around the pivot axis 220 as the mirror 300 pivots.

The servo motor 230 is mounted vertically to an interior portion 450 of the mirror housing 210 where it is not in view during normal operation of the vehicle 777. The second pulley 250 is mounted on a motor shaft 270 and spins when the servo motor 230 is energized.

The servo motor 230 and the mirror 300 are physically arranged within the mirror housing 210 such that the first pulley 240 is mounted to the motor shaft 270, and the second pulley 250 is mounted to the mirror 300, and all are substantially aligned. The drive belt 260 passes around and is held in place by the first pulley 240 and the second pulley 250. When the servo motor 230 is energized and begins to rotate, it turns the first pulley 240, which in turn moves the drive belt 260. Motion of the drive belt 260 applied to the second pulley 250 thereby causes the mirror 300 to rotate 600.

The operator controls 550 are mounted at any convenient location within a passenger cabin of the vehicle 777. Non-limiting example of locations within the passenger cabin that may be convenient include a location on the dashboard near the operator or locations on interior door armrests. The operator controls 550 comprise one or more switches, buttons, or other controls that allow the vehicle operator to rotate 600 the mirror 300 that is located in the exterior mirror assembly 200. Various embodiments of the operator controls 550 will be discussed momentarily.

The control wiring 500 conveys electrical signals from the operator controls 550 to the exterior mirror assembly 200. The electrical signals determine when and how the servo motor 230 will rotate 600. As a non-limiting example, if the control wiring 500 is not energized, the servo motor 230 may not rotate. If the control wiring 500 is energized with an electrical signal having a first polarity, the servo motor 230 may rotate in a first rotational direction. When the control wiring 500 is energized with an electrical signal having a second polarity, the servo motor 230 may rotate in a second rotational direction.

The power wiring 515 conveys electrical energy from the vehicle battery 530 to the side-view vehicle mirror 100. Depending upon the embodiment, the power wiring 515 may bring the electrical energy from the vehicle battery 530 to the operator controls 550 or to a control circuit board 510 located within the exterior mirror assembly 200. Note that for embodiments without a control circuit board 510, the control wiring 500 and the motor wiring 520 are identical, and the control wiring is routed directly to the servo motor 230.

In one embodiment (as illustrated in FIG. 5A), the power wiring 515 conveys electrical energy from the vehicle battery 530 to the operator controls 550. In this embodiment, the operator controls 550 comprise a first control 552 only. When the first control 552 is not activated, the electrical energy does not pass to the servo motor 230, and the servo motor 230 does not rotate. When the first control 552 is activated, the control wiring 500 is energized with electrical energy having a first polarity and the servo motor 230 rotates 600. The servo motor 230 will continue to rotate only so long as the first control 552 is activated, therefore it becomes the responsibility of the operator to activate the first control 552 until the mirror 300 turns into the desired position and to then deactivate the first control 552. If the mirror 300 rotates too far, then the first control 552 must be activated again until the mirror 300 rotates around to the desired position again. In this embodiment, the mirror 300 will only turn in one direction or it may be stopped, and it will not turn in the reverse direction.

In a different embodiment (as illustrated in FIG. 5B), the power wiring 515 conveys electrical energy from the vehicle battery 530 to the operator controls 550. In this embodiment, the operator controls 550 comprise the first control 552 and a second control 554. When neither the first control 552 nor the second control 554 are activated the electrical energy does not pass to the servo motor 230, and the servo motor 230 does not rotate. When the first control 552 is activated, the control wiring 500 is energized with electrical energy having a first polarity, and the servo motor 230 rotates in the first rotational direction 610. The servo motor 230 will continue to rotate in the first rotational direction 610 only so long as the first control 552 is activated therefore it becomes the responsibility of the operator to activate the first control 552 until the mirror 300 turns into the desired position, and to then deactivate the first control 552. When the second control 554 is activated, the control wiring 500 is energized with electrical energy having a second polarity and the servo motor 230 rotates in the second rotational direction 620. The servo motor 230 will continue to rotate in the second rotational direction 620 only so long as the second control 554 is activated therefore it becomes the responsibility of the operator to activate the second control 554 until the mirror 300 turns into the desired position, and to then deactivate the second control 554. If the mirror 300 rotates too far, then either the first control 552 or the second control 554 may be activated until the mirror 300 rotates to the desired position. In this embodiment, the mirror 300 may turn in both rotational direction or it may be stopped.

In another embodiment (as illustrated in FIG. 5C), the side-view vehicle mirror 100 comprises the control circuit board 510, a mirror position sensor 560, and mirror position sensor wiring. The mirror position sensor 560 is a subassembly that is mounted in close physical proximity to the mirror 300 and which is capable of providing an electrical signal to the control circuit board 510 indicating that the mirror 300 is in proper alignment. Non-limiting examples of technologies usable as the mirror position sensor 560 include micro switches and electro-optical components. Proper alignment of the mirror 300 is defined to mean that either the glass side of the mirror 310 has rotated to a position where it is usable by the operator to see behind the vehicle 777, which is called the mirror position; or that the mirror has rotated 180° from that position and the protected back side of the mirror 320 is now presented externally to the vehicle 777, which is called the protected position.

In operation, when the mirror 300 has rotated around the pivot axis 220 to a properly aligned position 400, then the mirror position sensor 560 asserts a signal to the control circuit board 510. If the mirror 300 is not in the properly aligned position 400 then the mirror position sensor 560 de-asserts the signal to the control circuit board 510. In the embodiment illustrated in FIG. 5C, the operator controls 550 comprise the first control 552 only. When the operator activates the first control 552, an electrical signal is passed over the control wiring 500 to the control circuit board 510, which in turn energizes the motor wiring 520 to cause the servo motor 230 to turn in the first rotational direction 610. In this case it does not matter if the operator deactivates the first control 552 before the mirror 300 reaches the properly aligned position 400, because the control circuit board 510 will keep the motor wiring 520 energized until a signal arrives from the mirror position sensor 560 via the mirror position sensor wiring 570 indicating that the mirror 300 has reached the properly aligned position 400. At that time, the control circuit board 510 will de-energize the motor wiring 520, and the servo motor 230 will stop rotating. If the operator activates the first control 552 a second time, then an electrical signal is passed over the control wiring 500 to the control circuit board 510, which in turn energizes the motor wiring 520 to cause the servo motor 230 to turn in either the first rotational direction 610, or the second rotational direction 620 until the mirror position sensor 560 again indicates that the mirror 300 has reached the properly aligned position 400.

In another embodiment (as illustrated in FIG. 5D), the side-view vehicle mirror 100 comprises the control circuit board 510, the mirror position sensor 560, and mirror position sensor wiring. The operator controls 550 comprise the first control 552 and the second control 554. When the operator activates the first control 552, an electrical signal is passed over the control wiring 500 to the control circuit board 510, which in turn energizes the motor wiring 520 to cause the servo motor 230 to turn in the first rotational direction 610. In this case, it does not matter if the operator deactivates the first control 552 before the mirror 300 reaches a proper position, because the control circuit board 510 will keep the motor wiring 520 energized until a signal arrives from the mirror position sensor 560 via the mirror position sensor wiring 570 indicating that the mirror 300 has reached the properly aligned position 400. At that time, the control circuit board 510 will de-energize the motor wiring 520, and the servo motor 230 will stop rotating. If the operator activates the second control 554, then an electrical signal is passed over the control wiring 500 to the control circuit board 510, which in turn energizes the motor wiring 520 to cause the servo motor 230 to turn in the second rotational direction 620 until the mirror position sensor 560 again indicates that the mirror 300 has reached the properly aligned position 400.

In this embodiment, activating the first control 552 causes the mirror 300 to rotate into the "mirror position", and activating the second control 554 causes the mirror 300 to rotate into the "protected position". Furthermore, activating the first control 552 when the mirror is already in the "mirror position" has no effect because the control signal is ignored by the control circuit board 510, and activating the second control 554 when the mirror 300 is already in the "protected position" has no effect because the control signal is ignored by the control circuit board 510.

In some embodiments, the invention 100 may automatically rotate the mirror 300 between the "mirror position" and the "protected position" based upon the status of the ignition key or the engine. As a non-limiting example, in embodiments where the control circuit board 510 is provided with an ignition signal 580 input meaning either that the a key (not shown) has been inserted into the ignition switch (not shown), the engine has been started, or the vehicle 777 has otherwise been determined to be in use, then the control circuit board 510 can energize the servo motor 230 to drive the mirror 300 into the "mirror position". When the ignition signal 580 indicates that the engine has been stopped, the key has been removed from the ignition switch, or the vehicle 777 has otherwise been determined to not be in use.

Although this disclosure has presented a side-view vehicle mirror 100 that comprises the pivot axis 220 that is oriented horizontally, those skilled in the art will recognize that the pivot axis 220 can be oriented vertically, or at many other angular orientations, without departing from the spirit and scope of the present invention as long as other components are reoriented to match the orientation of the pivot axis 220. Non-limiting examples of other components that may be reoriented to match the pivot axis 220 orientation include the mirror 300, the service motor 230, the motor shaft 270, the first pulley 240, the second pulley 250, and the drive belt 260.

With respect to the above description, it is to be realized that the optimum dimensional relationship for the various components of the invention described above and in FIGS.

1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A side-view vehicle mirror comprising:

an exterior mirror assembly, operator controls, control wiring, and power wiring;

wherein the exterior mirror assembly is mounted outside of a vehicle;

wherein the operator controls cause a mirror mounted within the exterior mirror assembly to rotate by 180° thus moving a glass side of the mirror to a position within the exterior mirror assembly and presenting a protected back side of the mirror outside of the vehicle;

wherein the exterior mirror assembly comprises a mirror housing, a pivot axis, a servo motor, a first pulley, a second pulley, a drive belt, and the mirror;

wherein the mirror housing supports and protects the servo motor and the mirror;

wherein the mirror housing improves the vehicle appearance and aerodynamics;

wherein the pivot axis is a rod connected to the inside of the mirror housing at two opposing inside walls of the mirror housing;

wherein the pivot axis passes through the mirror which is pivotally mounted on the pivot axis;

wherein the first pulley is mounted to the top of the mirror;

wherein the pivot axis passes through the first pulley and the first pulley pivots around the pivot axis as the mirror pivots;

wherein the servo motor is mounted vertically to an interior portion of the mirror housing where it is not in view during normal operation of the vehicle;

wherein the second pulley is mounted on a motor shaft and the second pulley spins when the servo motor is energized;

wherein the servo motor and the mirror are physically arranged within the mirror housing such that the first pulley, mounted to the motor shaft, and the second pulley, mounted to the mirror, are substantially aligned;

wherein the drive belt passes around and is held in place by the first pulley and the second pulley;

wherein energizing the servo motor begins causes the first pulley to turn;

wherein as a result of the first pulley turning the drive belt moves;

wherein movement of the drive belt is applied to the second pulley thereby causes the mirror to rotate;

wherein the operator controls are mounted within a passenger cabin;

wherein the operator controls allow the vehicle operator to rotate the mirror that is located in the exterior mirror assembly;

wherein the control wiring conveys electrical signals from the operator controls to the exterior mirror assembly;

wherein an absence of the electrical signals from the operator controls results in the mirror not moving;

wherein a presence of the electrical signals having a first polarity from the operator controls causes the servo motor may rotate in a first rotational direction;

wherein a presence of the electrical signals having a second polarity from the operator controls causes the servo motor may rotate in a second rotational direction;

wherein the power wiring conveys electrical energy from a vehicle battery to the side-view vehicle mirror via the operator controls.

2. The side-view vehicle mirror according to claim 1

Wherein the side-view vehicle mirror comprises a control circuit board;

wherein the power wiring conveys electrical energy from the vehicle battery to the side-view vehicle mirror via the control circuit board.

3. The side-view vehicle mirror according to claim 2 wherein the operator controls comprise a first control;

wherein when the first control is not activated the electrical energy does not pass to the servo motor and the servo motor does not rotate;

wherein when the first control is activated, the control wiring is energized with electrical energy of a first polarity and the servo motor rotates;

wherein the servo motor will continue to rotate only so long as the first control is activated.

4. The side-view vehicle mirror according to claim 2 wherein the operator controls comprise the first control and a second control;

wherein when neither the first control nor the second control are activated the electrical energy does not pass to the servo motor and the servo motor does not rotate;

wherein when the first control is activated, the control wiring is energized with electrical energy of a first polarity and the servo motor rotates in the first rotational direction;

wherein the servo motor will continue to rotate in the first rotational direction only so long as the first control is activated;

wherein when the second control is activated, the control wiring is energized with electrical energy of a second polarity and the servo motor rotates in the second rotational direction;

wherein the servo motor will continue to rotate in the second rotational direction only so long as the second control is activated.

5. The side-view vehicle mirror according to claim 2 wherein the side-view vehicle mirror comprises a mirror position sensor and mirror position sensor wiring;

wherein the mirror position sensor is a subassembly that is mounted in physical proximity to the mirror;

wherein the mirror position sensor is capable of providing an electrical signal to the control circuit board via the mirror position sensor wiring indicating that the mirror is in proper alignment.

6. The side-view vehicle mirror according to claim 5 wherein the operator controls comprise the first control;

wherein when an operator activates the first control an electrical signal is passed over the control wiring to the control circuit board;

wherein the control circuit board energizes motor wiring to cause the servo motor to turn in the first rotational direction;

wherein the control circuit board will keep the motor wiring energized until a signal arrives from the mirror position sensor via the mirror position sensor wiring indicating that the mirror has reached a properly aligned position;

wherein when the signal arrives at the control circuit board from the mirror position sensor indicating that the mirror has reached the proper alignment the control circuit board will de-energize the motor wiring and the servo motor will stop rotating.

7. The side-view vehicle mirror according to claim 5
wherein the operator controls comprise the first control and the second control;
wherein when an operator activates the first control an electrical signal is passed over the control wiring to the control circuit board;
wherein the control circuit board energizes motor wiring to cause the servo motor to turn in the first rotational direction;
wherein the control circuit board will keep the motor wiring energized until a signal arrives from the mirror position sensor via the mirror position sensor wiring indicating that the mirror has reached a properly aligned position.

8. The side-view vehicle mirror according to claim 7
wherein when the operator activates the second control then an electrical signal is passed over the control wiring to the control circuit board;
wherein the control circuit board energizes the motor wiring to cause the servo motor to turn in the second rotational direction;
wherein the control circuit board will keep the motor wiring energized until the mirror position sensor indicates that the mirror has reached the properly aligned position.

9. The side-view vehicle mirror according to claim 5
wherein the side-view vehicle mirror comprises an ignition signal;
wherein the ignition signal is an indication to the control circuit board that the vehicle is in use;
wherein the control circuit board energizes the servo motor to rotate the mirror to the mirror position when the ignition signal indicates that the vehicle is in use;
wherein the control circuit board energizes the servo motor to rotate the mirror to a protected position when the ignition signal indicates that the vehicle is not in use.

* * * * *